US006860468B1

(12) United States Patent
Morin

(10) Patent No.: US 6,860,468 B1
(45) Date of Patent: Mar. 1, 2005

(54) FLOWABLE-MATERIAL TRANSFER DEVICE AND SYSTEM

(75) Inventor: Claude Roger Morin, Hermon, ME (US)

(73) Assignee: Spill Free Oil Drainage Products, LLC, Hermon, ME (US)

( * ) Notice: Subject to any disclaimer, the term of this patent is extended or adjusted under 35 U.S.C. 154(b) by 13 days.

(21) Appl. No.: 10/655,933

(22) Filed: Sep. 5, 2003

(51) Int. Cl.$^7$ .............................................. F16K 51/00
(52) U.S. Cl. ............... 251/149.6; 251/89.5; 137/614.06
(58) Field of Search .............................. 251/149–149.9, 251/89.5; 137/614.06; 141/301

(56) References Cited

U.S. PATENT DOCUMENTS

| | | |
|---|---|---|
| 3,743,053 A | 7/1973 | Kuklewicz |
| 4,078,763 A | 3/1978 | Yamamoto |
| 4,815,566 A | 3/1989 | Caruso et al. |
| 5,048,578 A | 9/1991 | Dorf et al. |
| 5,259,588 A | 11/1993 | Crosby, Jr. et al. |
| 5,765,612 A | 6/1998 | Morin |

*Primary Examiner*—Steven O. Douglas
(74) *Attorney, Agent, or Firm*—Patricia M. Mathers; Thomas L. Bohan

(57) ABSTRACT

Flowable-material transfer apparatus and device for transferring flowable material from one containment vessel or system to another. The apparatus comprises a connector device, a closed conduit system, and applicable force systems and controls for effecting efficient flow of the flowable material. The connector device has a source-transfer-apparatus container connector and transfer-apparatus connector that together provide a flowpath from the source container to a destination container. The source-container connector contains a normally-closed flow valve situated in the flowpath and a flow-valve actuation assembly. The connector device includes a device locking mechanism that prevents the connector device from being disconnected when the flow valve is open.

11 Claims, 4 Drawing Sheets

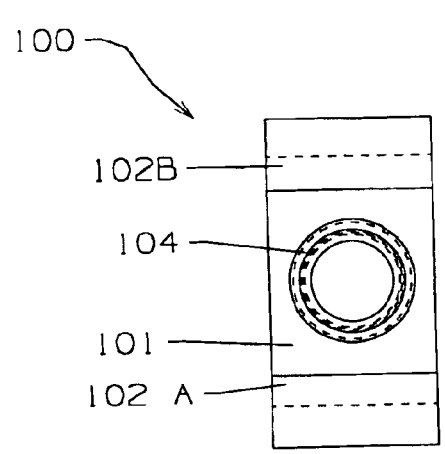
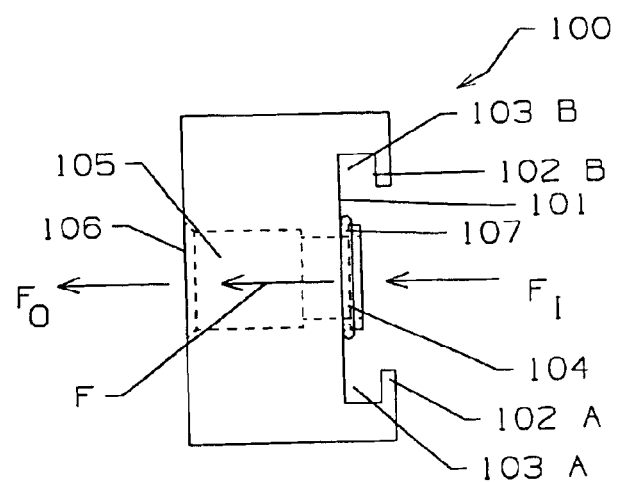
FIG. 3  FIG. 2
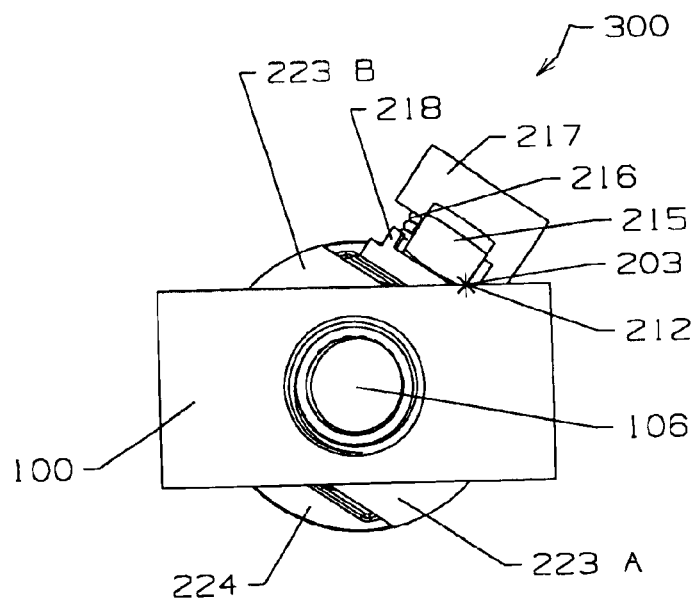
FIG. 6

FLOWABLE-MATERIAL TRANSFER DEVICE AND SYSTEM

BACKGROUND INFORMATION

1. Field of the Invention

The invention relates to the field of material handling systems. More particularly, the invention relates to a transfer system for safely moving flowable materials from one containment to another one. More particularly yet, the invention relates to a device for connecting and locking flowable-material transfer apparatus to a flowable-material container.

2. Description of the Prior Art

Transferring flowable material from one container to another is a common task in industry and commerce. The term "flowable materials" as used herein includes industrial solvents and petroleum products, foodstuffs, toxic and non-toxic materials, combustible and non-combustible materials. The term "flowable" includes liquids, gases, slurries, sludges, pastes, flowable solids, such as powdered, pulverized, granulated, pelletized, and encapsulated material, and other material that may flow naturally or be made to flow from one place of containment to another. The methods of transfer vary with the reasons for removal, the nature of the material, and the use to which the material is to be put. Whatever the reason for transferring a material from one container to another, the act of transfer always represents a heightened risk to the secure containment of the material. The risk is particularly great when the material is toxic, corrosive, or otherwise hazardous to the environment, or when working under large volumes of pressurized material. Increased awareness of environmental hazards and increased sensitivity to workers' safety have led to greater focus on ensuring the safety and reliability of material handling systems. Consequently, apparatuses and devices that help prevent or reduce the risk of spillage or leakage of flowable material are extremely desirable and useful, both for reasons of general health and welfare and for economic reasons.

Many devices and systems have been developed to address the problem of unintentional escape of flowable material, be it by spillage or gaseous escape, during the transfer of flowable materials from one containment vessel to another. Most of these involve attaching external apparatus to the source containment vessel or system that enables the flowable material to be moved to a destination containment vessel or system through a completely enclosed conduit system that may comprise hose, tubing, pipe, ductwork, or other conduit, or may simply be the opening between two adjacent, "docked" systems. Two major sources of failure of a material transfer system are inherently present when transferring flowable materials: 1) the very act of connecting or disconnecting the external apparatus to the source container; and 2) failure of the connector device. For this reason, connector devices and valves are critical components of flowable-material transfer systems.

U.S. Pat. No. 5,765,612, issued to the inventor of the present invention, discloses apparatus for safely draining motor oil from the oil pan of an engine crank case. The apparatus includes a three-part connector device. One part is semi-permanently assembled in the oil pan drain opening, replacing the standard solid drain plug. This oil-pan connector also includes a flow valve. The other part connects with the drain apparatus. When the two parts are connected together, they provide a flowpath for the oil to be drained from the oil pan, when the flow valve is open. Oil-pan drain openings on different vehicles may differ in size or type, and thus, the third part of the connector device is an adapter that enables connectors of various sizes and shapes to be connected to a standard size drain connector. The adapter is screwed onto the connector part that is fitted in the drain pan opening and mates easily and conveniently with the standardized connector that connects to the drain apparatus.

The disclosed connector device has several disadvantages. The fact that no means are provided to prevent one from detaching the connector of the drain apparatus from the oil pan connects the while the flow valve is open is a serious safety risk. Another disadvantage is that the service operator must first check for the size and type of adapter needed to fit the particular oil-pan source connector, and fetch and mount the adapter on the source connector before attaching the drain apparatus. This is time-consuming and, thus, cost-inefficient. A further disadvantage of the disclosed connector device is that an addtional pressure-actuated valve is incorporated into the part of the connector that connects to the drain apparatus. The drain apparatus includes a negative pressure system that assists the evacuation of the oil from the oil pan and the valve is used to apply the negative pressure to the flowpath. Incorporating this valve into the connector device itself, however, increases greatly the manufacturing cost of the connector device and also introduces an additional source of failure at this critical point. This pressure-actuated valve can be placed at any number of other places in the drain apparatus, where it is easier and simpler to install and maintain.

Conventional source-container connectors, i.e., connectors attached to the container to be drained, typically include multiple components and are constructed to be disassemblable, either to permit adaptation of the source-container connector to a number of different connectors and/or to permit replacement of the components. The source-container connector fulfills a critical function with regard to safety and efficiency in the material transfer process and providing a connector that is disassemblable introduces a source of failure, and, thus, is undesirable. Furthermore, a disassemblable connector is generally more costly to manufacture, as the design of the device is more complex.

Most connectors for industrial applications include some provision to prevent the flow valve on the source-container from being accidentally or unintentionally opened. No provision is made, however, to prevent accidental or unintentional closure of the valve. Closing a valve during processing of flowable material, particularly when pressure forces are involved to generate or assist flow, may cause degradation or failure of the source and/or destination containers and conduit on either side of the valve.

What is needed, therefore, is a system and device for safely and reliably transferring a flowable material from one container to another. What is further needed is such a device that is simple and quick to operate and is economic in its fabrication. What is yet further needed is such a device that effectively prevents an unintentional disconnection of the device while the flow valve is open. What is still further needed is such a device that reduces the risk of unintentional opening of the flow valve when the system is not connected, and unintentional closing of the valve during material transfer.

BRIEF SUMMARY OF THE INVENTION

For the reasons cited above, it is an object of the present invention to provide a flowable-material transfer system that includes a two-part connector device for transferring flowable material from a source container to a destination container. It is a further object of the present invention to provide a simple, inexpensive connector device within such a system that is easy to operate and effects a secure, safe, positive connection. It is a yet further object of the present invention to provide such a connection device that prevents an unintentional disconnection of the connector device when the flow valve is open. It is a still further object to provide such a device that reduces the risk of unintentional change in the operative state of the flow valve while material is being transferred, either from a closed to an open state, or from an open to a closed state.

The objectives have been accomplished by providing a flowable-material transfer system comprising conventional transfer apparatus for transferring flowable material from a source container to a destination container, and a connector device according to the invention. The connector device comprises a source-container connector and a transfer-apparatus connector, whereby the source-container connector and transfer-apparatus connector mate to form a rugged, reliable, leak-tight connection. The connector device also includes several safety features that provide increased safety and reliability in the transfer of flowable material.

The conventional transfer-apparatus comprises a conduit system, a destination container, and optionally, a force system for applying a force to the flowable material as well as any number of valves and controls to effectively operate the force system. The force system may include, for example, a pressure pump to compel flow of the material through the system under the influence of negative or positive pressure.

It is generally understood that the direction of flow through the transfer system is in one direction. Thus, the inflow side and the outflow side of the components in the connector device do not change, that is, the inflow side is always the inflow side. The transfer-apparatus connector of the present invention has an inflow side that removably connects to the source-container connector, and an outflow side that connects to the transfer apparatus. A throughbore from the inflow side to the outflow side of the transfer-apparatus provides a flowpath through this connector. The source-container connector has a connector means on the inflow side that attaches to the source container, a flowpath formed by a throughbore from the inflow side to the outflow side, a flow valve placed in the flowpath, a valve-actuation assembly, a connector-device locking means, and a connector means on the outflow side that connects this connector to the inflow side of the transfer-apparatus connector. The inflow side of the source-container connector is directly attachable to the source container, or to a passage means connected to or extending from the source container. In many industrial situations, it is most efficient and convenient to permanently attach the source-container connector to the source container, as the apparatus used to transfer the material is generally always the same or similar. The source-container connector, as provided for installation in a transfer system, is constructed to resist or prevent disassembly and to reduce the opportunity for failure.

Mating and securing of the transfer-apparatus connector to the source-container connector is best effected by a locking mechanism that is simple and easy to operate. In the connector device according to the invention, tabs are provided on the one or the other connector and interlock with flanged recesses on the corresponding other connector. Connection of the transfer-apparatus connector to the source-container connector way is accomplished with a single, quick, twisting motion of no greater than one-quarter turn. Once connected, the connector device according to the invention provides a flowpath from the source container to the destination container. Generally, the flow path is interrupted by a flow valve in the source-container connector.

For reasons of safety and effective control of the flowable material transfer process, a positive action is required to change the operative state of the flow valve. The flow-valve actuation assembly on the source-container connector comprises a flow-valve actuation means which holds the flow valve in its closed position or in its open position. It is noted here that it is important with regard to safety and effective control that the flow valve be neither opened nor closed inadvertently. Opening the valve inadvertently results in spillage or leakage of the flowable-material; closing the valve inadvertently may result in damage to the components of the transfer system. For this reason, a safety mechanism is provided on the valve-actuation assembly that keeps the valve from being easily unintentionally opened or closed. In one embodiment, the flow-valve actuation means is a spring-biased lever, although many other actuation means are known and suitable, such as a button that snaps into a detent, an electromechanical relay, or a hydraulic or pneumatic controlled mechanism. Only by applying a force against the spring is the lever movable from one operative position to another. In a simple embodiment, this safety mechanism is a motion-limiting device such as a stop bar that limits or interrupts motion of the actuation lever.

The connector device according to the invention further comprises a disconnect-prevention means for blocking the disconnection of the transfer-apparatus connector from the source-container connector while the flow valve is open. The disconnect-prevention means is foolproof in that it is effective as soon as the transfer-apparatus connector is connected to the source-container connector and the flow-valve actuation means is moved to the open-valve position. The disconnect-prevention means remains effective and prevents disconnection of the transfer-apparatus connector from the source-container connector as long as the flow valve of the source-container connector is open. In a simple embodiment, the shape or contour of the transfer-apparatus connector provides an interference surface that effectively blocks disconnection. For example, one or more surfaces on the transfer-apparatus connector are in close proximity and aligned with the valve actuation means lever in its open-valve position such that the surfaces effectively block the one or the other connector from being rotated to the degree necessary to disconnect the connectors. Other suitable disconnect-prevention means are available, such as a pin or tab on one side and a hole or slot on the other, or electromagnetic and pneumatic means.

Reducing sources of error of the connectors is a major concern with regard to the safety and reliability of the connector device and, for this reason, both the source-container connector and the transfer-apparatus connector according to the invention are manufactured substantially as single-piece, non-disassembleable components. Once the flow valve and valve-actuation assembly are assembled in the source-container connector, its housing is sealed to prevent one from replacing or repairing the internal components. Providing both the source-container connector and the transfer-apparatus connector as sealed units and made with a minumum number of parts reduces the manufacturing costs and also contributes to the reliability of the device and, thus, of the flowable-material transfer system.

It is to be understood that other objects and advantages of the present invention will be made apparent by the following description of the drawings and detailed description of the preferred embodiment of the invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

BRIEF DESCRIPTION OF THE DRAWINGS

FIG. 2 is a side view of the transfer-apparatus connector.

FIG. 3 is a front view of the transfer-apparatus connector of FIG. 2.

FIG. 6 is an illustration of a disconnect-prevention mechanism.

DETAILED DESCRIPTION OF THE INVENTION

Figure 1:
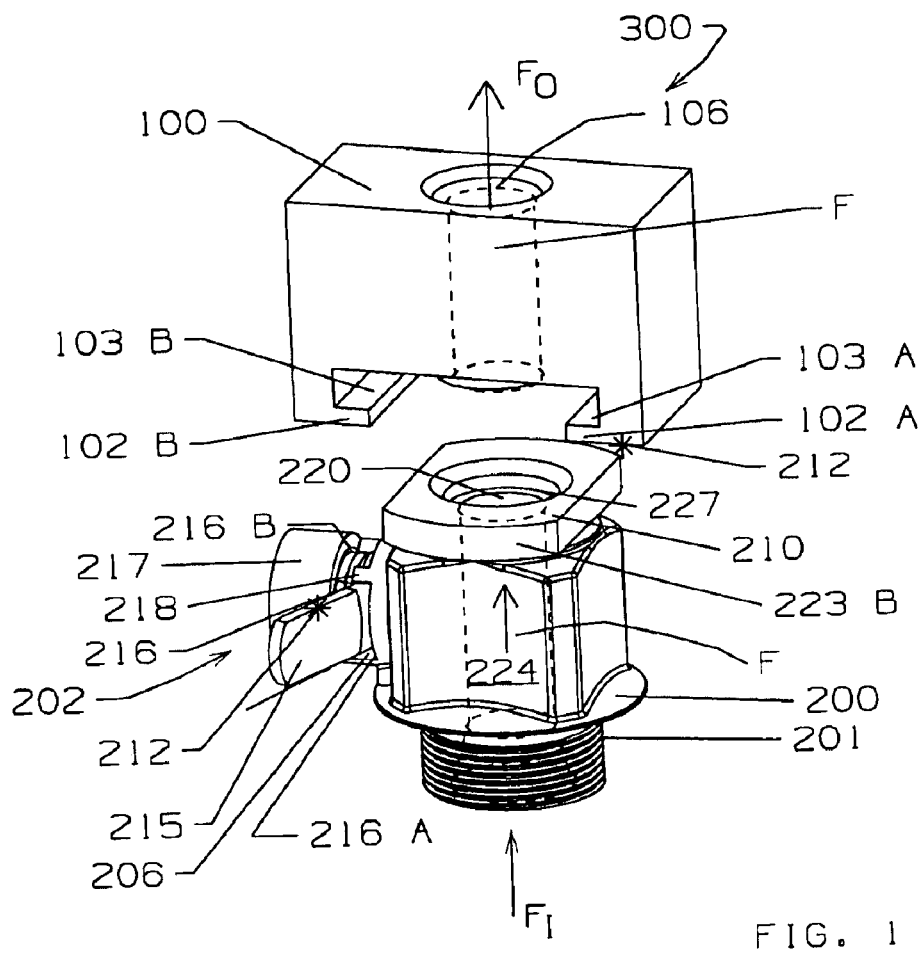
FIG. 1 is a perspective view of the connector device according to the invention.

FIG. 1 is a perspective view of a connector device 300 according to the invention. The connector device 300 comprises a transfer-apparatus connector 100 and a source-container connector 200 that mate to form a leak-tight seal and to provide a flowpath F for flowable material through the connector device 300. In FIG. 1, the transfer-apparatus connector 100 is shown in close proximity to and ready to be mated to the source-container connector 200. When the connector device 300 is installed for operation, the flowpath F through the connector device 300 is generally in the direction of an inflow $F_I$ toward an outflow $F_O$, as indicated by the respective arrows. Hereinafter the arrows inflow $F_I$ and outflow $F_O$ shall be used to designate the inflow and outflow sides of all components of the connector device 300.

FIGS. 2 and 3 illustrate the transfer-apparatus connector 100 of the connector device 300 of the present invention. The transfer-apparatus connector 100 has an inflow side and an outflow side as indicated respectively by the arrows $F_I$ and $F_O$. A first mating assembly 101 that includes flanges 102A and 102B and recesses 103A and 103B is provided on the inflow side. A throughbore 105 from the inflow side to the outflow side forms the flowpath F and terminates in an outflow opening 106. In the embodiment shown, a connector extension 104 extends from the first mating assembly 101 for connecting the transfer-apparatus connector 100 with a mating surface on the source-container connector 200. A compressible sealing ring 107 is fitted at the base of the connecting extension 104 to ensure a leak-tight seal of the connection. The outflow opening 106 includes a connecting means, not shown, to attach the transfer-apparatus connector 100 to apparatus of a transfer system, as discussed below. The connecting means is appropriate to the transfer apparatus and the type of flowable material being processed and may be a threaded, press-fit, clamped, pinned, or other appropriate means of connection.

Figure 4:
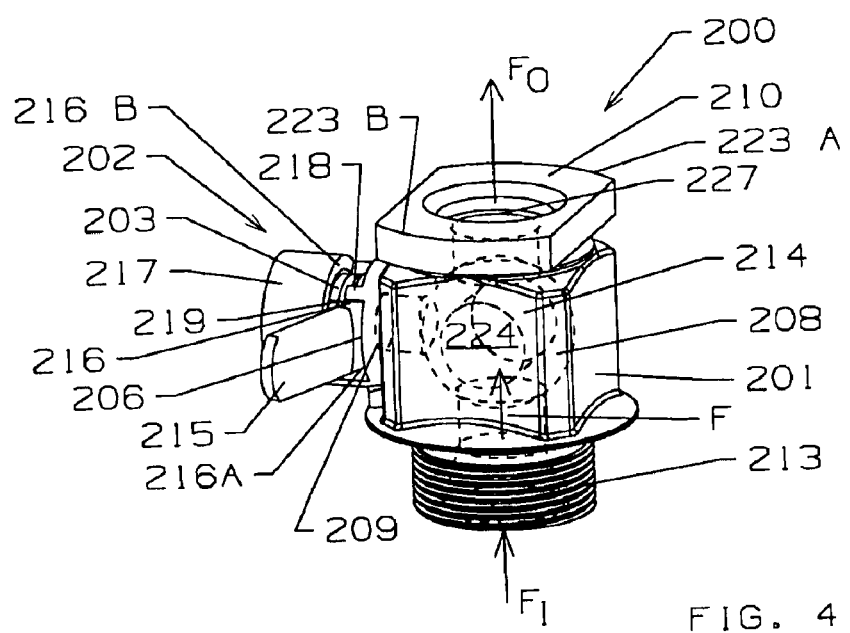
FIG. 4 is a perspective view of the source-container connector.

FIG. 4 illustrates the source-container connector 200 of the connector device 300 of the present invention. The source-container connector 200 comprises a housing 224, a flow valve assembly 208, a flow-valve actuation assembly 202, a second mating assembly 210, and a source-container attachment means 213. The flowpath F through the source-container connection 200 is through the passage formed by the source-container attachment means 213 at the inflow side $F_I$ and out an outflow opening 227 on the outflow side $F_O$, as indicated by the respective arrows. In the embodiment shown, the outflow opening 227 is constructed to receive the connector extension 104 and to provide a leak-tight seal in the flow path. The flow valve 208 is a conventional ball valve with a flowpath connecting passage 214 and is encased within the housing 201. The flow-valve actuation assembly 202 comprises an actuation-assembly housing 217 with a sealed housing end 217A (best seen in FIG. 5), a flow-valve actuation means 215, a flow-valve actuation shaft 209, and a valve-position-locking mechanism 203. The flow-valve actuation shaft 209 is fixedly attached to the flow valve 208 and is enclosed in the flow-valve actuation assembly housing 217. The actuation means 215 is fixedly attached to the flow-valve actuation shaft 209 and extends out through an actuation slot 216 in the flow-valve actuation assembly housing 217. The flow-valve actuation shaft 209 has a longitudinal axis that runs perpendicular to an axis that extends longitudinally through the center of the flow-valve throughbore. The actuation means 215 is keyed to the flow-valve actuation shaft 209 such that rotating the actuation means 215 radially about the longitudinal axis of the flow-valve actuation shaft 209 forces the flow-valve actuation shaft 209 to rotate correspondingly, which causes the flow valve 208 to open or to close.

The valve-position-locking mechanism 203 comprises a stop bar 218 and a biasing spring 219. The flow-valve actuation slot 216 has a first edge 216A that is closer to the flow valve 208 and a second edge 216B that is closer to the sealed housing end 217A. The biasing spring 219 is assembled on the flow-valve actuation shaft 209 and normally biases the actuation means 216 up against the first edge 216A. The stop bar 218 juts from the flow-valve actuation assembly housing 217 from the first edge 216A into the actuation slot 216 and extends far enough into the actuation slot 216 to prevent the actuation means 215 from being moved the entire length of the actuation slot 216 while it is still biased up against the first edge 216A. In effect, the stop bar 218 delineates a valve-open position 205 (seen in FIG. 5) and a valve-closed position 206. The actuation slot 216 is wide enough and the stop bar 218 short enough to allow the actuation means 215 to be rotated past the stop bar 218 when the actuation means 215 is pulled against the biasing force toward the second edge 216B of the actuation slot 216. Thus, the actuation means 215 must first be forced to the second edge 216B of the actuation slot 216 before it is rotatable along the actuation slot 216 from the valve-closed position shown in FIG. 4 to the valve-open position shown in FIG. 5 and, similarly, before it is rotatable in the opposite direction.

It is understood that the valve-position-locking means 203 of the embodiment of the present invention is one of many possible means of actuating and securing the operative state of the flow valve 208. For example, any manual means, such as a knob or push button that snaps into an opening, may be used, depending on the type of valve employed, and any electrical, electronic, pneumatic, or other actuation means appropriate to the particular use of the connecting device. Regardless of the means of actuation, the source-container connector according to the invention incorporates a valve-position-locking means for preventing inadvertent and careless operation of the flow valve. Many stopping means exist, other than the stop bar 218 of the preferred embodiment of the present invention, to impede or prevent inadvertent and accidental valve actuation, such as a detent, a safety latch, a keyed lock, an electrically or otherwise remotely operated safety switch, lever, pin, or catch, or other means according to the particular use and environment of the connecting device in the flowable-material transfer system.

With respect to all possible embodiments of the present invention, it is understood, but not shown in the drawings, that a sealing means is provided around the flow valve 208, or any substitute valve, and around the flow-valve actuation assembly 202, or other actuation means that resides in or is connected into the flowpath. Such a sealing means prevents leaking of the flowable material around these parts. Further, this sealing means may also serve as, and be identical to, a bearing surface on which the parts move.

Now referring to FIGS. 1 and 4, the second mating assembly 210 at the outflow side $F_O$ of the source-container connector 200 is shown having a planar surface and tabs 223A and 223B that extend outward from the housing 201 in the same plane as that of the planar surface. The ends of the tabs 223A and 223B are radiused. Note that the actuation means 215 as shown in FIGS. 1 and 4 is shown in the valve-closed position 206. The source-container connector 200 is, thus, in its valve-closed position when it is not connected to the transfer-apparatus connector 300. As shown in FIG. 1, the transfer-apparatus connector 100 is positioned with respect to the source-container connector 200 such that the first mating assembly 101 faces the second mating assembly 210 in a substantially parallel alignment, with the connector extension 104 in the first mating assembly 101 aligned with the outflow opening 227 in the second mating assembly 210. Having thus positioned the transfer-apparatus connector 100 and the source-container connector 200, the first mating assembly 101 and the second mating assembly 210 are brought together. The second mating assembly 210 fits between the flanges 102A and 102B of the first mating assembly 101, allowing the connector connecting extension 104 and the sealing ring 107 to be seated inside the outflow opening 227 of the source-container connector 200. The transfer-apparatus connector 100 is then compressed against the source-container connector 200 and rotated one-quarter turn, so that the recesses 103A and 103B of the transfer-apparatus connector 100 engage and capture the tabs 223A and 223B of the source-container connector 200. This mating action compresses the sealing ring 107 of the transfer-apparatus connector 100 and positively attaches the transfer-apparatus connector 100 to the source-container connector 200.

Figure 5:
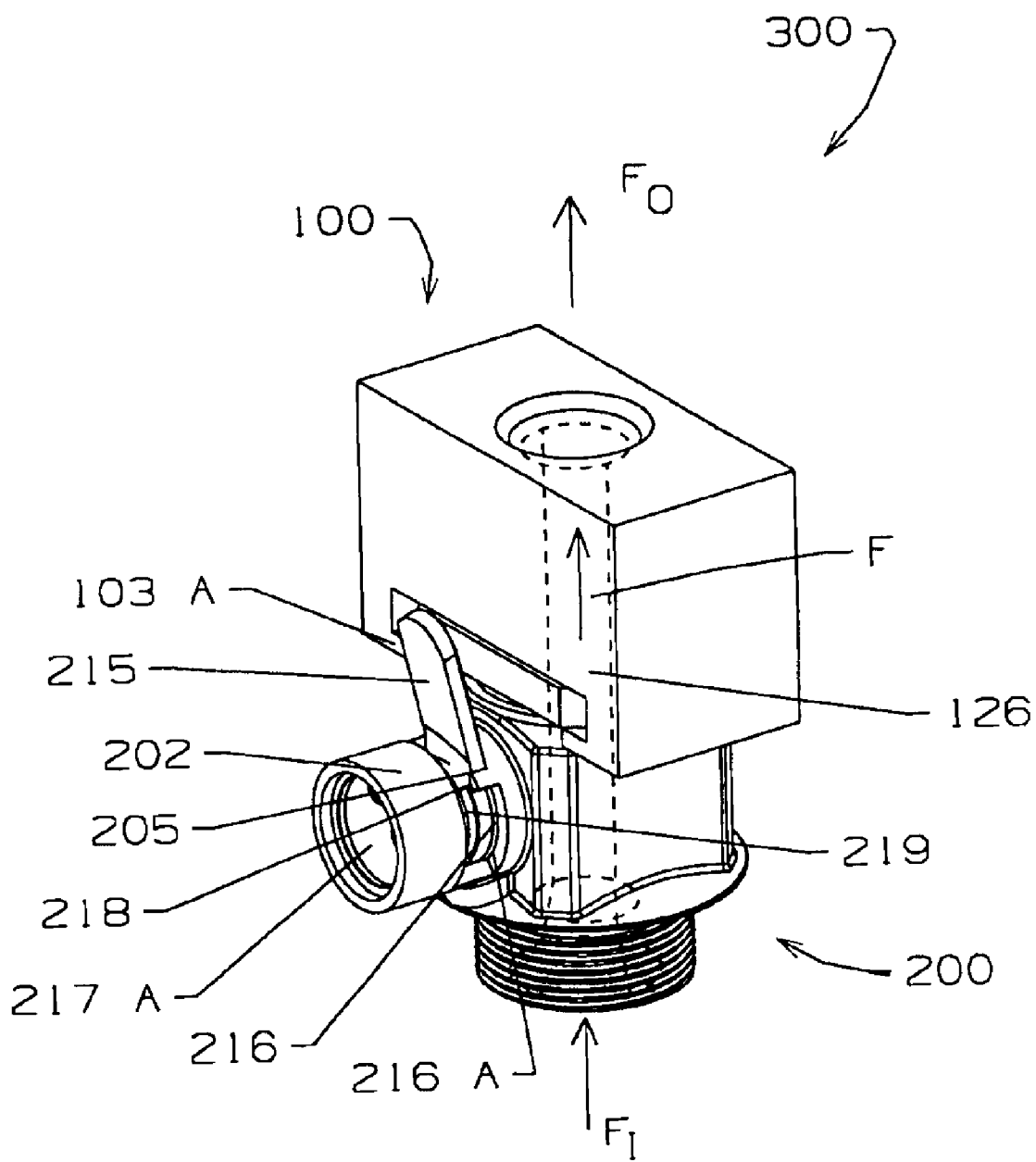
FIG. 5 is a perspective view of the mated connector device.

FIG. 5 now shows the source-container connector 200 and the transfer-apparatus connector 100 mated together as the connector device 300. After the transfer-apparatus connector 100 and the source-container connector 200 are securely mated, the actuation means 215 may be lifted away from the first edge 216A of the actuation slot 216 and rotated along the actuation slot 216 past the stop bar 218 to the valve-open position 205, as depicted in FIG. 5. The ball valve 208 is open in this configuration and the flowpath F extends from the inflow side $F_I$ of the source-container connector 200 to the outflow side $F_O$ of the transfer-apparatus connector 100. The flowpath F is unimpeded and flowable material is transferable through the mated connector device 300.

FIG. 6 illustrates a second safety feature on the connector device 300 according to the invention. This second safety feature, a disconnect-prevention means 212, prevents the transfer-apparatus connector 100 from being disconnected from the source-container connector 200 while the flow valve 208 is open. The illustration in FIG. 6 is a planar view of the connector device 300 from the outflow $F_O$ side of the transfer-apparatus connector 100, showing the actuation means 215 in the valve-pen position 205 and the transfer-apparatus connector 100 rotated approximately ⅛ of a turn. The disconnect-prevention means 212 is an interference configuration of the actuation means 215 and a surface of the transfer-apparatus connector 100. As indicated by the asterisk, the actuation means 215 in it valve-open position hits up against the transfer-apparatus connector 100, preventing it from being rotated the full ¼ turn, which is needed to release the second mating assembly 210 from the first mating assembly 101. In the embodiment shown, the transfer-apparatus connector 100 is fabricated as a rectangular block, and the actual point of interference between the actuation means 215 and the transfer-apparatus connector 100 is the edge of the block that is on the inflow side of the block. It is not necessary that the transfer-apparatus connector 100 be formed as a rectangular block. In order for the disconnect-prevention mechanism to function, however, it is critical that the actuation means 215, when in its valve-open position 205, be situated close to the transfer-apparatus connector 100 and/or the transfer-apparatus connector 100 provide a contour such that interference between the actuation means 215 and the transfer-apparatus connector 100 occurs when the connector 100 is rotated less than ¼ of a turn to the right or to the left of the actuation mechanism 203.

The connector device 300 may be constructed of any materials that are suitable for its intended application. In many applications in which the connector device 300 is subjected to positive or negative pressures, and/or to caustic or corrosive materials, it may be desirable to construct the device with particularly rugged materials, such as cast metal, metal alloy, composites, cermetal materials, or any combination thereof. In other applications, lighter loads may allow some components to be constructed of synthetic or composite materials. Similarly, the connectors between the source-container and the source-container connector 200, and the transfer-apparatus connector 100 and transfer apparatus may be any means suitable to the type of flowable material being transferred and to the environmental requirements. Accordingly, it is within the scope of the invention to include such connector means as threaded, press-fit, clamped, pinned, adhered or other suitable conventional connector means. As well, the source-container connector 200 and/or the transfer-apparatus connector 100 may be permanently attached to, or constructed as an integral part of, the source container and the transfer apparatus, respectively.

Although the preferred embodiment of the present invention detailed herein uses tabs and corresponding flanges that require a quarter turn to connect the connectors, alternative embodiments may use any number of tabs and corresponding flanges, and such configurations may require a twist through a smaller arc to effect the attachment. Also, a stop or block may be added to one or more of the tabs or flanges to prevent over-twisting in other embodiments of the present invention. Furthermore, a particular alternative embodiment of the present invention may incorporate compressible or solid bosses into the tabs and/or the flanges, on the surface of one or both, in order to produce a more positive fit and connection of the mated openings and mating assemblys and/or greater compresson of the seal.

It is also to be understood that, just as various types of valves, valve actuation means, and actuation impeding means may be employed in the source-container connector of the present invention, so too may various disconnectpreventon means be employed according to the particular type of valve and/or actuation means used. For example, such means may be mechanical, such as a tab and slot, a pin and hole, post and stop, or magnetic, electrical, electronic, pneumatic, or other suitable types of control means.

Figure 7:
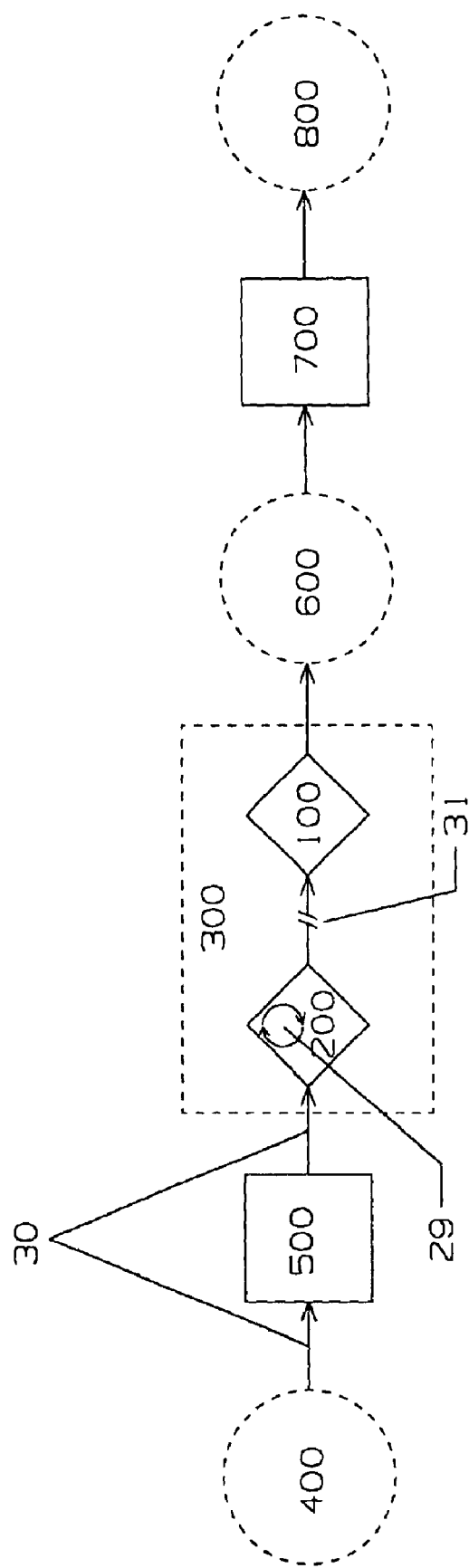
FIG. 7 is a schematic view of the flowable-material transfer system.

FIG. 7 is a schematic illustration of a flowable-material transfer system 900 of the present invention. Fundamentally, the connector device 300 of the present invention resides between a source container 500 holding flowable material and a destination container 700 to which the flowable material is to be transferred. The arrows P in FIG. 6 represent connecting passages between the various components of the flowable-material transfer system 900. The direction of the arrows indicate the direction of flow of the flowable material and/or the direction of pressure exerted on or in the flowable-material transfer system 900. The broken line between the source-container connector 200 and the transfer-apparatus connector 100 represents the connectable/disconnectable connector device 300, although, depending on the use to which the flowable-material transfer system 900 is put, any number of points of disconnection and disassembly may be present. Nevertheless, the mated connecting device 300 is a critical component of the flowable-material transfer system 900 and, in a particular embodiment, may be the only such point of disconnection between the source and destination containers 500/700.

Although the flow valve 208 of the source-container connector 200 is the only valve shown in this schematic of the flowable-material transfer system 900, it shall be understood that other valves and flow-control devices may be present at various points in the system to assist the flow of the material or to prevent back-flow of the material being transferred. Furthermore, any number of automatic or manual shut-off valves may be placed at locations where dissassembly or failure of the system may be expected. The source-container connector 200 is affixed to the source container 500 either directly or by a passage means of pipe, hose, tubing, duct, bored block, or other conduit. Similarly, the transfer-apparatus connector 100 is affixed to the destination container either directly or by such passage means.

A configuration of the flowable-material transfer system 900 comprising only a source container 500, a source-container connector 200, a transfer-apparatus connector 100, a destination container 700, and the passage means between them is one that relies on natural forces, such as gravity, or inherent conditions, such as pressure differential, to effect the movement of the flowable material. An alternative configuration of the flowable-material transfer system 900 employs a pressurizing means 400 to exert positive pressure on the flowable material in the source container 500 to expel it from the source container 500 through the mated connecting device 300 and into the destination container 700. The pressure applied may result from mechanical (e.g., a piston or plunger), hydraulic, fluidic, thermodynamic, or any other forces suitable to move the particular flowable material and appropriate for the components from, through, and to which the material is moved.

Another alternative embodiment of the flowable-material transfer system 900 employs a pumping means 600 to exert negative pressure on the flowable material, thereby drawing it from the source container 500, and positive pressure in the direction of the destination container 700, thereby forcing the flowable material into the destination container 700. Any suitable pump or pump-like device, including, for example, a convection or capillary-action inducing device, may be employed, according to the nature of the flowable material and the components from, through, and to which it is moved.

The pumping means 600 may be located either between the source container 500 and the source-container connector 200, or between the transfer-apparatus connector 100 and the destination container 700, or both.

Yet another alternative embodiment of the flowable-material transfer system 900 employs a depressurizing means 800 to exert negative pressure on the destination container, thereby drawing flowable material from the source container 500, through the mated connecting device 300, and into the destination container 700. Depressurization of the destination container 700 may result from mechanical, hydraulic, fluidic, thermodynamic, or any other force produced or introduced by the depressurizing means 800. Any combination of a pressurizing means 400, pumping means 600, and/or depressurizing means 800 may be employed within any of the various possible embodiments of the flowable-material transfer system 900.

It is understood that the embodiment described herein is merely illustrative of the present invention. Variations in the construction of the connecting device and the flowable-material transfer system of the present invention may be contemplated by one skilled in the art without limiting the intended scope of the invention herein disclosed and as defined by the following claims.

What is claimed is:

1. A connector device for providing a flowpath for flowable material between a source container with a destination container, said connector device comprising:

a first connector having a flow valve that is positionable between a normally-closed position and an open position, a housing, a first flowpath, and a flow-valve actuation assembly;

a second connector having a second flowpath;

a disconnect-prevention means; and a connector device housing;

wherein said first connector is attachable to said source container and said second connector is removably connectable to said first connector so as to connect said first flowpath with said second flowpath to form a continuous flowpath;

wherein said flow valve is a normally-closed flow valve that interrupts flow from said first container into said first flowpath until said flow valve is moved to said open position;

wherein said disconnect-prevention means includes a first disconnect-prevention means on said first connector and a second disconnect-prevention means on said second connector and wherein, when said second connector is connected with said first connector and said flow-valve is in said open position, said first disconnect-prevention means prevents said second connector from being moved into a disconnect position.

2. The connector device of claim 1, wherein said flow-valve actuation assembly comprises a flow-valve actuation means, an actuation-control means, and a control-means safety mechanism, wherein said flow-valve actuation means is movable between a first position in which said flow valve is in said open position and a second position in which said flow valve is in said normally-closed position by said actuation-control means, and wherein said control-means safety mechanism secures said actuation control means against accidental movement into said first position or into second position.

3. The connector device of claim 2, wherein said connector-device housing includes an actuation-assembly housing;

wherein said flow-valve actuation means is a shaft fixedly connected to said flow valve, said actuation control-means is a lever fixedly attached at one end to said shaft, and said flow valve is movable between said normally-closed position and said open position by moving said lever so as to rotate said shaft;

wherein said control-means safety mechanism includes a limit-motion slot provided in said actuation-assembly housing, a safety bar, and a biasing spring, said limit-motion slot having a first edge and said lever extending through said limit-motion slot;

wherein said biasing spring is assembled on said shaft and provides a biasing force that urges said lever against said first edge of said limit-motion edge;

wherein said safety bar has a length, a thickness, a first side and a second side, said safety bar extending from said housing at said first edge into said limit-motion slot, thereby forming a valve-open slot position on said first side and a valve-closed slot position on said second side;

wherein said length of said safety bar is sufficient to prevent said lever from moving between said valve-open slot position and said valve-closed slot position without providing an external force to overcome said biasing force, and said limit-motion slot has a width that is at least as wide as said length plus said thickness of said safety bar; and wherein said lever is movable between said valve-open slot position and said valve-closed slot position in said limit-motion slot by applying said external force to said lever in a direction opposite to said biasing force and simultaneously sliding said lever past said safety bar.

4. The connector device of claim 3, wherein said first connector has a first inflow side and a first outflow side and a first mating assembly mounted on said housing at said first outflow side, and said second connector has a second inflow side and a second outflow side and a second mating assembly formed on said second inflow side, wherein said first mating assembly mates with said second mating assembly to form a leak-tight and secure connection between said first connector and said second connector.

5. The connector device of claim 4, wherein said first mating assembly comprises a first outflow opening and a tab and said second mating assembly comprises a second inflow opening that is sealably matable with said first outflow opening and a flanged recess, and wherein said second connector is connectable with said first connector by mating said second inflow opening with said first outflow opening and rotating said second connector relative to said first connector so as to move said tab into said flanged recess.

6. The connector device of claim 5, wherein said tab of said first mating surface includes two tabs extending opposite one another forming a planar surface about said first outflow opening;

wherein said flanged recess of said second mating surface includes two flanged recesses, flange ends of said two flanged recesses defining an initial receiving space and recess ends of said to flange recesses defining a locking receiving space, wherein, when said second connector is connectable with said first connector by mating said second inflow opening with said first outflow opening with said tabs received in said initial receiving space and rotating said second connector relative to said first connector so as to move said tabs into said locking receiving space.

7. The connector device of claim 5, wherein said tab includes a plurality of tabs and said flanged recess includes a plurality of recesses that corresponds in number with that of said plurality of tabs.

8. The connector device of claim 5, wherein said disconnect-prevention means comprises an interference between a first interference surface on said first connector and a second interference surface on said second connector such that said disconnect-prevention means prevents a rotation of said second connector relative to said first connector sufficient to disconnect said second connector from said first connector when said flow-valve is in said open position.

9. The connector device of claim 8, wherein said lever of said flow-valve actuation-assembly provides said first interference surface and said second mating surface provides said second interference surface, and wherein, when said lever is in said open-valve position, said lever prevents said second connector from being rotated relative to said first connector sufficient to disconnect said second connector from said first connector.

10. The connector device of claim 1, wherein said first connector has a first mating assembly with a first mating outflow opening on said outflow side and said second connector consists of a connector block having a second mating assembly with a second mating inflow opening, and a second outflow opening, wherein said second mating assembly is connectable with said first mating assembly.

11. The connector device of claim 1, wherein said first connector housing is a sealed housing that encloses said flow valve and said actuation shaft and is unopenable without destroying said first connector.

* * * * *

UNITED STATES PATENT AND TRADEMARK OFFICE
CERTIFICATE OF CORRECTION

PATENT NO. : 6,860,468 B1
DATED : March 1, 2005
INVENTOR(S) : Claude Roger Morin It is certified that error appears in the above-identified patent and that said Letters Patent is hereby corrected as shown below:

Title page,
Item [57], ABSTRACT,
Lines 6-7, replace "source-transfer apparatus container" with -- source container --

Column 8,
Line 3, replace "valve-pen" with -- valve-open --

Signed and Sealed this

Twelfth Day of July, 2005

JON W. DUDAS
*Director of the United States Patent and Trademark Office*